United States Patent
Ray et al.

(10) Patent No.: US 7,352,085 B2
(45) Date of Patent: Apr. 1, 2008

(54) DISCONNECTION OF ELECTRONIC DEVICE FROM POWER SOURCE

(75) Inventors: Robert Ray, Corbett, OR (US); Ron Juve, Brush Prairie, WA (US); Roger N. Switzer, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 10/639,068

(22) Filed: Aug. 12, 2003

(65) Prior Publication Data
US 2005/0035668 A1  Feb. 17, 2005

(51) Int. Cl.
*H01H 47/00* (2006.01)
*B41J 29/38* (2006.01)

(52) U.S. Cl. .......................... 307/125; 347/5
(58) Field of Classification Search ............... 307/125, 307/114; 347/5
See application file for complete search history.

(56) References Cited

U.S. PATENT DOCUMENTS

| | | | | |
|---|---|---|---|---|
| 4,439,688 A | * | 3/1984 | Schornack | 307/115 |
| 4,581,571 A | * | 4/1986 | Hansen | 320/136 |
| 5,339,009 A | * | 8/1994 | Lai | 315/291 |
| 5,495,453 A | * | 2/1996 | Wojciechowski et al. | 365/185.18 |
| 5,551,033 A | * | 8/1996 | Foster et al. | 713/100 |
| 5,715,465 A | * | 2/1998 | Savage et al. | 713/340 |
| 5,780,941 A | * | 7/1998 | Pauve | 307/139 |
| 6,304,005 B1 | * | 10/2001 | Aoki et al. | 307/64 |
| 2003/0110405 A1 | * | 6/2003 | Ryu | 713/320 |
| 2004/0153759 A1 | * | 8/2004 | Motegi | 714/14 |

FOREIGN PATENT DOCUMENTS

| | | |
|---|---|---|
| JP | 09-130970 | 5/1997 |
| JP | 2000-161757 | 6/2000 |

OTHER PUBLICATIONS

Euler power supply electrical schematic, Sep. 12, 2000.
Euler power supply external reference specification, Jul. 31, 2000.
Electrical characteristics test report for Euler power supply, Aug. 4, 2000.
Electromagnetic compatibility test report for Euler power supply, Aug. 4, 2000.
English translation of Japanese Office Action mailed May 9, 2006.

* cited by examiner

*Primary Examiner*—Michael Sherry
*Assistant Examiner*—Michael Rutland-Wallis

(57) ABSTRACT

A mechanism of one embodiment of the invention is disclosed that disconnects an electronic device from a power source includes a user-actuable switch, an electronically controllable switch, and a feedback mechanism. The electronically controllable switch couples the power source to the electronic device. The feedback mechanism turns on and off the electronically controllable switch in response to actuation of the user-actuable switch.

9 Claims, 5 Drawing Sheets

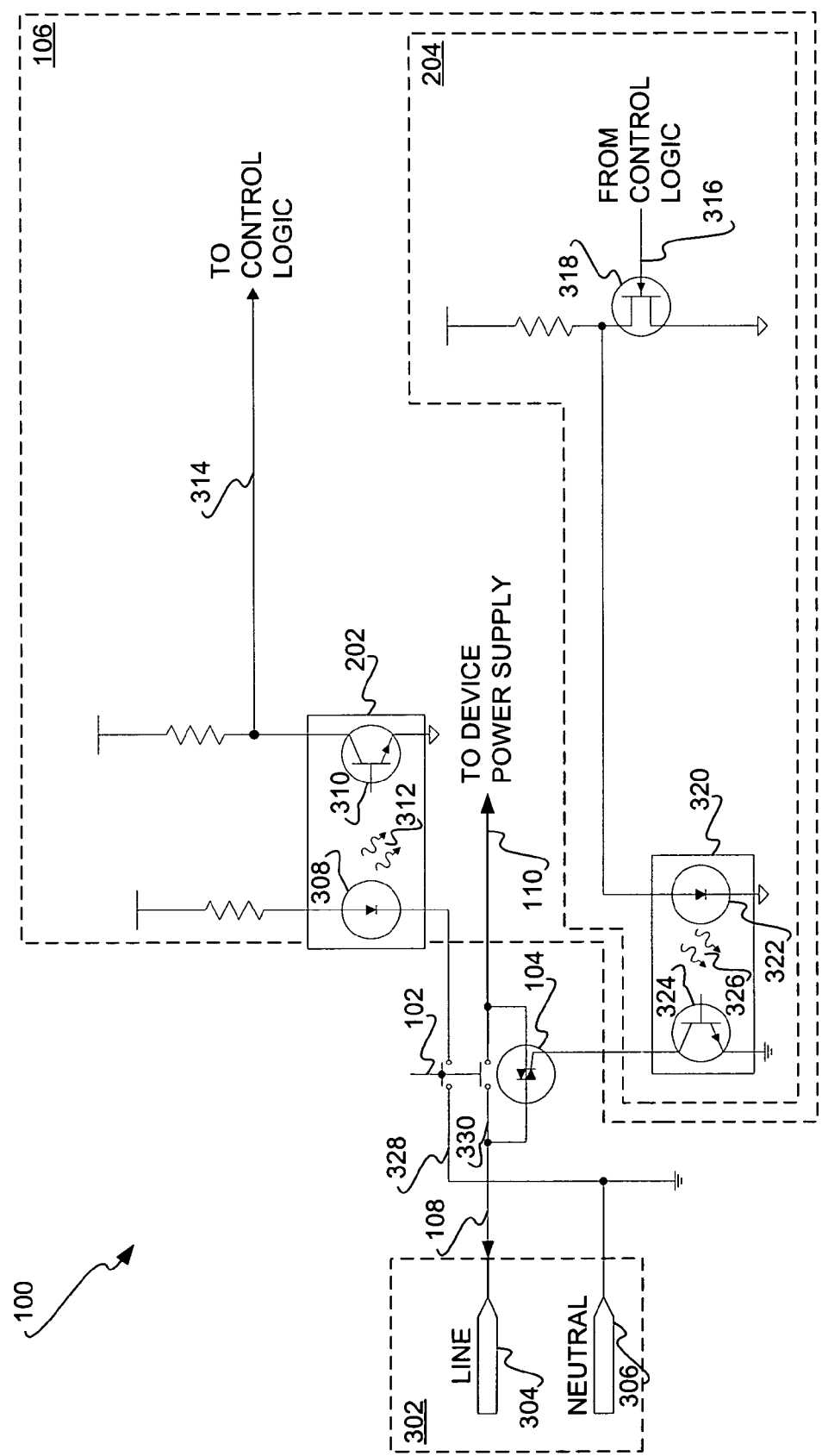

DISCONNECTION OF ELECTRONIC DEVICE FROM POWER SOURCE

BACKGROUND

Image-formation devices, such as inkjet-printing devices and laser-printing devices, as well as other types of computer peripheral devices and other types of electronic devices, generally consume power even when they are turned off, but are still connected to a power source, such as to an electrical outlet. Typically, the way to ensure that electronic devices do not consume any power is to physically disconnect them from the power source. For instance, the devices may be unplugged from wall outlets, or the surge protectors or power strips into which they have been plugged may be switched off.

Environmental groups and governmental organizations across the globe have recently focused on the energy that millions, if not billions, of such electronic devices waste when they are turned off by users but still are consuming power. The amount of power consumed by an individual electronic device when turned off may be less than a few watts. However, multiplied by the large number of devices in operation worldwide, the resulting waste of energy can be staggering.

An electronic device may include a power line switch that when actuated by the user immediately causes the device to stop consuming power from a power source. However, many types of electronic devices are not amenable to users abruptly turning off their power. For instance, image-formation devices usually need to execute a shutdown sequence before powering down, in the case of inkjet-printing devices, to recap their inkjet-printing mechanisms so that they do not dry out. If a user turns off power to such a device while in the middle of a print job, for example, the inkjet-printing mechanisms will not be recapped, and may prematurely dry out, resulting in user dissatisfaction, and in some instances, permanent device damage.

SUMMARY OF THE INVENTION

A mechanism of one embodiment of the invention to disconnect an electronic device from a power source includes a user-actuable switch, an electronically controllable switch, and a feedback mechanism. The electronically controllable switch couples the power source to the electronic device. The feedback mechanism turns on and off the electronically controllable switch in response to actuation of the user-actuable switch.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

FIG. 3 is an electrical schematic of a specific mechanism to completely disconnect an electronic device from a power source, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the embodiments. Other embodiments may be utilized and logical, mechanical, and other changes may be made without departing from the spirit or scope of embodiments of the present invention. The following detailed description is, therefore, not to be taken in a limiting sense, and the scope of the present invention is defined only by the appended claims.

Switch Mechanism

Figure 1:
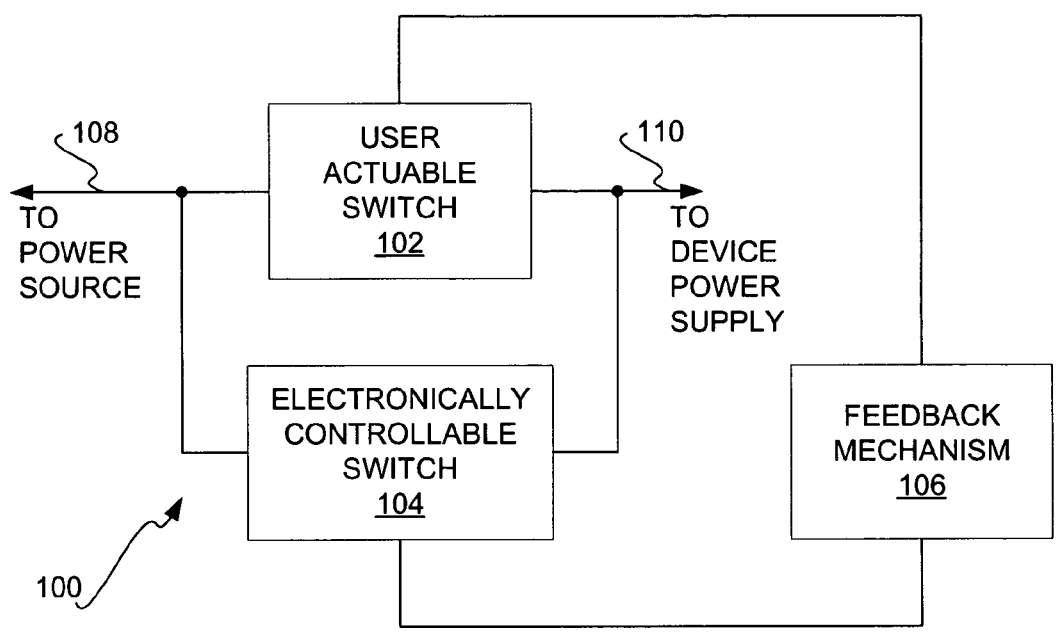
FIG. 1 is a diagram of a mechanism to completely disconnect an electronic device from a power source, according to an embodiment of the invention.

FIG. 1 shows a switch mechanism 100 to completely disconnect an electronic device from a power source, according to an embodiment of the invention. The electronic device may be a computer peripheral device, such as an image-formation device like an inkjet-printing device or a laser-printing device, or another type of electronic device. The power source may be alternating current (AC) received through a wall outlet. The power source may also be a battery or another type of power source.

The switch mechanism 100 includes a user-actuable switch 102, an electronically controllable switch 104, and a feedback mechanism 106. The user-actuable switch 102 connects the power source to the power supply of the electronic device, as indicated by the arrows 108 and 110. The user-actuable switch 102 may be a momentarily on switch, or an on-or-off switch, such as a push-on, push-off switch. A momentarily on switch is one that is on while a user is holding it down, and then turns back off when the user releases the switch. That is, the momentarily on switch remains in an on position while the user is actuating the switch, and is otherwise in an off position. An on-or-off switch is one that turns on when a user actuates the switch from an off position and that then remains on after the user has released the switch. The on-or-off switch is turned off from an on position when the user actuates the switch, and then remains off after the user has released the switch. The electronically controllable switch 104 also connects the power source to the power supply of the device, and thus is connected in parallel with the user-actuable switch 102.

The feedback mechanism 106 monitors actuation of the user-actuable switch 102 by the user, and in response turns on or off the electronically controllable switch 104. For example, where the electronic device is initially off and the user-actuable switch 102 is a momentarily on switch, the feedback mechanism 106 detects actuation of the user-actuable switch 102, and in response turns on the electronically controllable switch 104. As a result, when the user releases the user-actuable switch 102, the electronically controllable switch 104 maintains the connection of the power source to the power supply of the electronic device. The user-actuable switch 102 momentarily connects the power source to the device's power supply until the electronically controllable switch 104 is turned on. That is, the user-actuable switch 102 connects the power source to the power supply of the device so that the device can function and turn on the electronically controllable switch 104, after which time the user-actuable switch 102 can be released and thus turned off.

When the user actuates the user-actuable switch 102 again to turn off the electronic device, the feedback mechanism 106 detects the actuation, and in response can cause the device to perform a controlled shutdown routine before turning off the electronically controllable switch 104. Even when the user releases the switch 102, the power source remains connected to the power supply of the electronic device until the feedback mechanism 106 turns off the electronically controllable switch 104. This is because the electronically controllable switch 104 maintains the connection between the power source and the device's power supply until the switch 104 is itself turned off.

A controlled shutdown routine is generally considered as a routine performed by the electronic device to put its components and mechanisms in a suitable state so that power from the power source can be disconnected from the power supply of the device. For example, in the case of an inkjet-printing device, the inkjet-printing mechanism may be capped so that it does not prematurely dry out. The controlled shutdown routine thus allows a controlled powering off of the electronic device to occur, as compared to an abrupt powering off of the device in which the device's internal components and mechanism are not provided an opportunity to enter a suitable state prior to the electronic device powering off.

When the electronic device is initially off and the user-actuable switch 102 is an on-or-off switch, the feedback mechanism 106 again detects actuation of the actuable switch 102, and in response turns on the electronically controllable switch 104. When the user actuates the switch 102 to turn off the electronic device, the feedback 106 detects the actuation, and in response can cause the device to perform a controlled shutdown routine before turning off the electronically controllable switch 104. Therefore, even though the switch 102 is off, the power source remains connected to the power supply of the electronic device until the feedback mechanism 106 turns off the electronically controllable switch 104. That is, the electronically controllable switch 104 maintains the electrical connection between power source and the power supply even though the user-actuable switch 102 has been turned off, until the switch 104 is itself turned off.

The switch mechanism 100 ensures that when the electronic device is not on, the power supply of the device is completely disconnected from the power source 108. However, in at least one embodiment of the invention, very small leakage currents, measurable in micro-amps, may still occur from the electronically controllable switch 104. The terminology "completely disconnecting the power source from the electronic device" is therefore inclusive of situations in which such very small leakage currents are still present. Similarly, the terminology "the electronic device consuming no power" is inclusive of situations in which such very small leakage currents are still consumed. Because the user-actuable switch 102 and the electronically controllable switch 104 connect the power source to the power supply, as indicated by the arrows 108 and 110, when both the switches 102 and 104 are off, the power supply of the device receives no power. The electronic device thus consumes no power.

However, because the power source is not disconnected from the power supply until the electronically controllable switch 104 is turned off, the electronic device is still able to perform a controlled shutdown routine before power is disconnected from the device. The user is not able to abruptly disconnect power from the electronic device using the user-actuable switch 102, because the user-actuable switch 102 does not independently control power to the device, but rather works in unison with the electronically controllable switch 104. In the context of an inkjet-printing device, for example, this means that the device is able to cap the inkjet-printing mechanisms and/or perform other types of controlled shutdown routines before the electronically controllable switch 104 is turned off.

Figure 2:
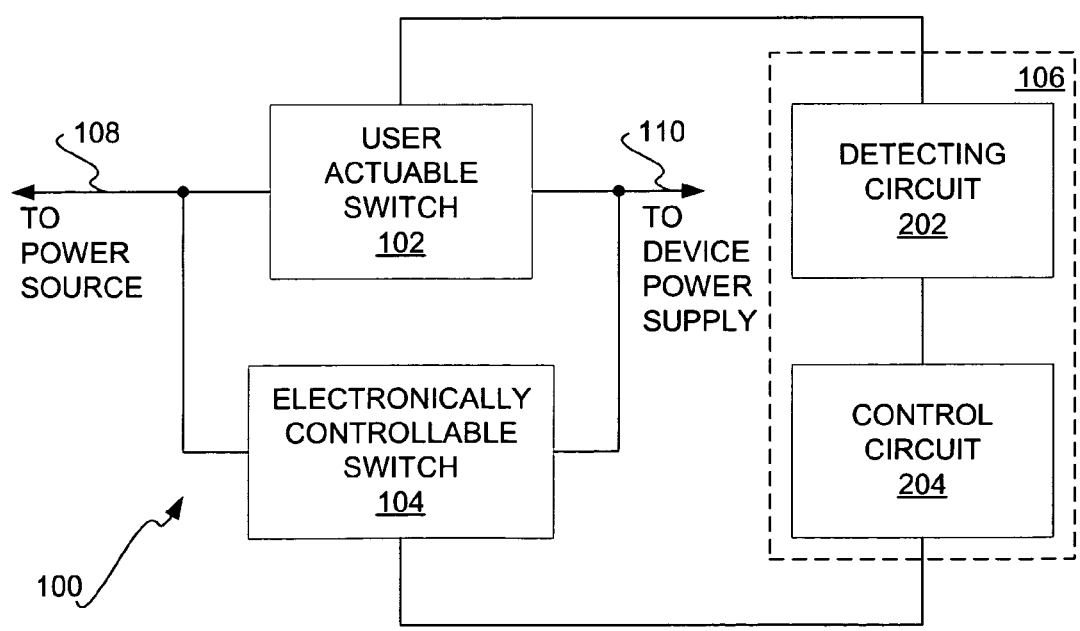
FIG. 2 is a diagram of the mechanism of FIG. 1 in more detail, according to an embodiment of the invention.

FIG. 2 shows the switch mechanism 100 in more detail, according to an embodiment of the invention. Specifically, in FIG. 2 the feedback mechanism 106 is implemented as including a detecting circuit 202 and a control circuit 204. The detecting circuit 202 detects actuation of the user-actuable switch 102. In response, the control circuit 204 controls the electronically controllable switch 104, either turning the switch 104 on or off. The detecting circuit 202 may be an isolating detecting circuit, such that the power source is electrically isolated within the detecting circuit. Likewise, the control circuit 204 may include an isolating circuit that internally electrically isolates the power source. Such isolating circuits may be desirable so that only the user-actuable switch 102, the electronically controllable switch 104, and the power supply of the electronic device are electrically coupled to the power source. The isolating circuits may be opto-isolative circuits, or other types of isolating circuits. In an alternative embodiment, the detecting circuit 202 is not an isolating detecting circuit, and instead the user-actuable switch 102 has sufficient electrical insulation to isolate the power source from the detecting circuit 202, and hence the feedback mechanism 106.

FIG. 3 shows one particular detailed implementation of the switch mechanism 100, according to an embodiment of the invention. As can be appreciated by those of ordinary skill within the art, other implementations may also implement the switch mechanism 100. The mechanism 100 is depicted such that the arrow 108 is connected to a power source that includes a "hot", or line, lead 304, and a neutral lead 306. The power source may be an AC power supply, to which the mechanism 100 can connect via a plug inserted into an electrical wall outlet.

The user-actuable switch 102 is depicted in FIG. 3 as a double-pole, single-throw switch having poles 328 and 330, and may be a momentarily on switch or an on-or-off switch. The switch 102 connects and disconnects the power source to the power supply of the electronic device, and turns on and off the detecting circuit 202 in correspondence with connecting and disconnecting the power source to the power supply. The electronically controllable switch 104 is depicted in FIG. 3 as a triac, which is a three-terminal semiconductor device for controlling current. The detecting circuit 202 is depicted in FIG. 3 as an opto-isolative circuit having an indicating element 308, such as a light-emitting diode (LED), and a detecting element 310, such as a phototransistor. Light is thus used to convey signaling between the indicating element 308 and the detecting element 310, such that the elements 308 and 310 are electrically isolated from one another. The control circuit 204 is depicted in FIG. 3 as including a transistor 318, and an opto-isolative circuit 320 having an indicating element 322, such as an LED, and a detecting element 324, such as a phototransistor.

When the electronic device is off, and the user actuates the user-actuable switch 102, the pole 330 of the switch 102 connects the power source 302 to the power supply of the device, as indicated by the arrows 108 and 110. The pole 328 of the switch 102 turns on the indicating element 308, which outputs light, as indicated by the arrows 312, that the detecting element 310 detects. The resulting detection is signaled to control logic, as indicated by the arrow 314. The control logic ensures that transistor 318 remains off, as indicated by the arrow 316, which turns on the indicating element 322.

The control logic may be implemented in hardware, software, or a combination of hardware and software. The control logic is the part of the feedback mechanism 106 of the switch mechanism 100 that monitors the detecting element 310. The control logic is also the part of the feedback mechanism 106 that controls the indicating element 322, via the transistor 318, in response to monitoring the detecting element 310. Finally, the control logic may also initiate the performance of, or perform, a controlled shutdown routine.

The light output by the indicating element 322, as indicated by the arrows 326, is detected by the detecting element 324. This turns on the electronically controllable switch 104. Thus, where the user-actuable switch 102 is a momentarily on switch, when the user releases the switch 102, the electronically controllable switch 104 maintains power from the power source 302 to the power supply of the electronic device.

Where the user-actuable switch 102 is a momentarily on switch, and when the electronic device is on, user actuation of the switch 102 causes the pole 328 of the switch 102 to turn on the indicating element 308. The detecting element 310 detects the light output by the indicating element 308, as indicated by the arrows 312, and the control logic is signaled as indicated by the arrow 314. The control logic may cause a controlled shutdown routine to be performed.

The control logic then turns on the transistor 318, as indicated by the arrow 316, which turns off the indicating element 322. The indicating element 322 ceases output of light, such that the detecting element 324 turns off, which turns off the electronically controllable switch 104. When the user releases the user-actuable switch 102, the power source 302 is completely disconnected from the power supply of the electronic device, since neither the switch 102 nor the electronically controllable switch 104 is on. If during the shutdown sequence, the user releases the switch 102 before the sequence is complete, the electronically controllable switch 104 remains on until the control logic turns on transistor 318 that turns off the indicating element 322. The cessation of light from the indicating element 322 causes the detecting element 324 to turn off which turns off the electronic switch 104, so that the power source 108 is completely disconnected from the device power supply 110.

Where the user-actuable switch 102 is an on-or-off switch, and when the electronic device is on, user actuation of the switch 102 causes the pole 328 of the switch 102 to turn off, turning off the indicating element 308. The detecting element 310 correspondingly turns off, effectively signaling the control logic as indicated by the arrow 314. The control logic may cause a controlled shutdown routine to be performed. The control logic then turns on the transistor 318, as indicated by the arrow 316, which turns off the indicating element 322. The indicating element 322 ceases output of light, turning off the detecting element 324, which turns off the electronically controllable switch 104. The power source 302 is completely disconnected from the power supply of the electronic device once the electronically controllable switch 104 is turned off, since user actuation of the user-actuable switch 102 had previously turned off the user-actuable switch 102, such that neither switch 102 nor the switch 104 is on.

Methods for Using Switch Mechanism

Figure 4A:
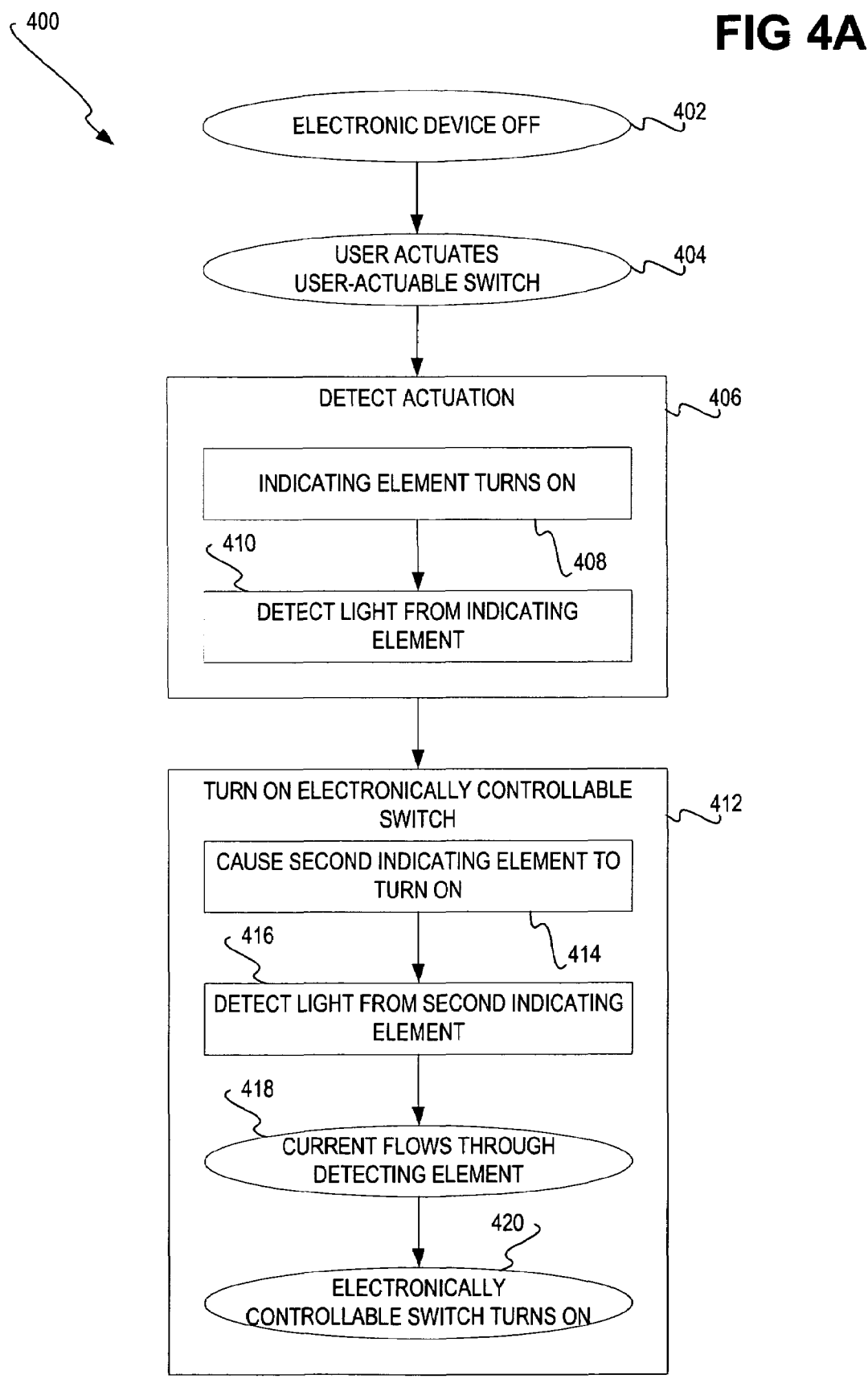
FIG. 4A is a flowchart of a method for using the mechanism of FIG. 3 to turn on an electronic device, according to an embodiment of the invention.

FIG. 4A shows a method 400 for turning on an electronic device employing the switch mechanism 100, according to an embodiment of the invention, where the user-actuable switch 102 of the switch mechanism 100 is a momentarily on switch or an on-or-off switch. The method 400 is specifically applicable to the switch mechanism 100 of FIG. 3. The method 400 is also generally applicable to the switch mechanism 100 of FIG. 1 or FIG. 2.

The electronic device is initially off (402), and the user actuates the user-actuable switch 102 to turn the electronic device on (404). Actuation of the user-actuable switch 102 causes the power source 302 to be correspondingly connected to the power supply of the electronic device, momentarily in the case where the switch 102 is a momentarily on switch. The actuation of the user-actuable switch is detected (406). Specifically, actuation of the user-actuable switch 102 causes the indicating element 308 to turn on and emit light (408), and the light from the indicating element 308 is detected by the detecting element 310 (410).

In response to detecting actuation of the user-actuable switch 102, the electronically controllable switch 104 is turned on (412). In the case where the switch 102 is a momentarily on switch, turning on the switch 104 maintains connection of the power source 302 to the power supply of the electronic device after the user has released the switch 102. Specifically, in response to detecting actuation of the user-actuable switch 102, the second indicating element 322 is turned on and emits light (414). Light from the indicating element 322 is detected by the second detecting element 324 (416), causing current to flow through the detecting element 324 (418). This turns on the electronically controllable switch 104 (420).

Figure 4B:
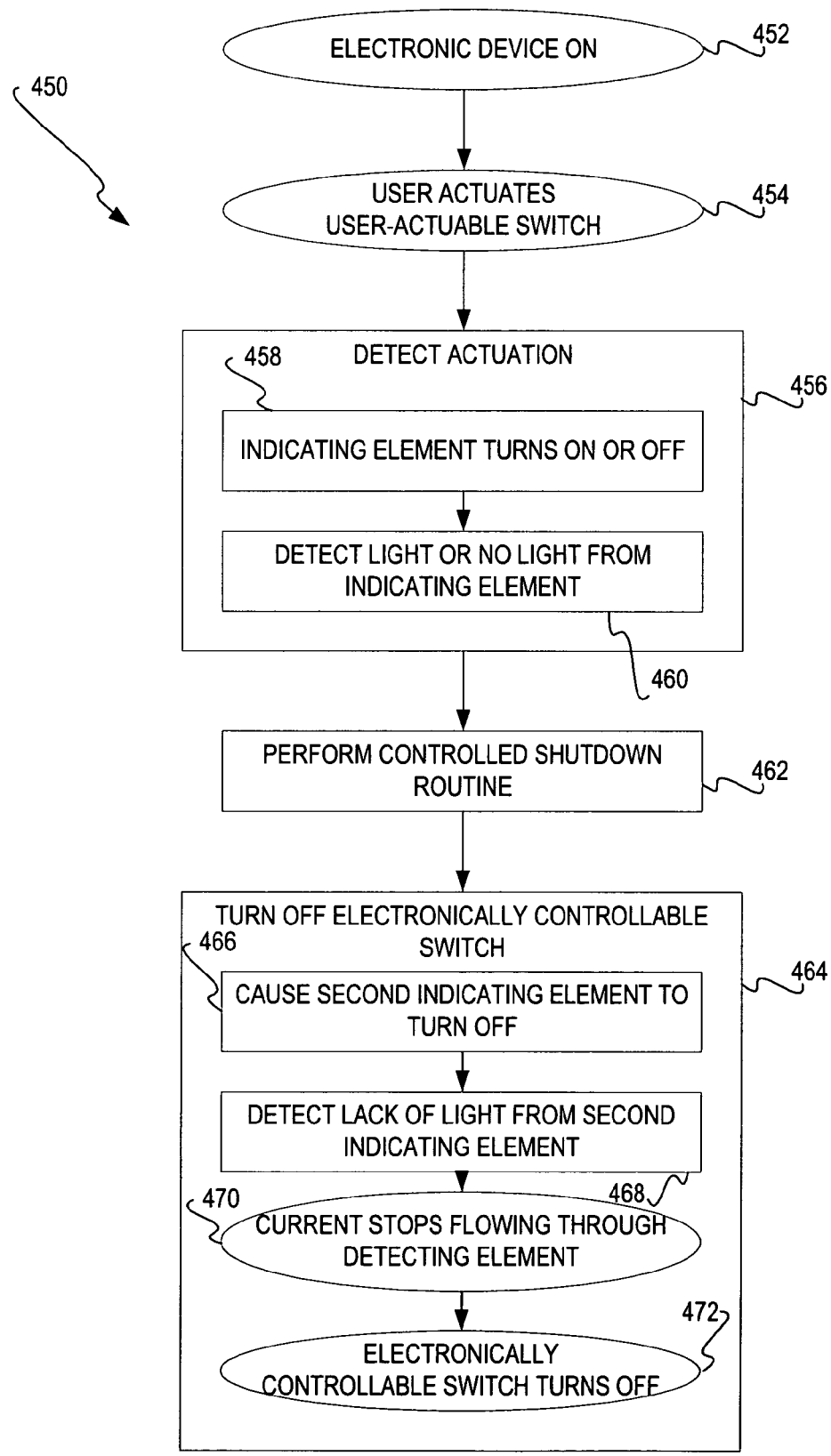
FIG. 4B is flowchart of a method for using the mechanism of FIG. 3 to turn off an electronic device, according to an embodiment of the invention.

FIG. 4B shows a method 450 for turning off an electronic device employing the switch mechanism 100, according to an embodiment of the invention, where the user-actuable switch 102 of the switch mechanism 100 is a momentarily on switch or an on-or-off switch. The method 450 is specifically applicable to the switch mechanism 100 of FIG. 3. The method 450 is generally applicable to the switch mechanism 100 of FIG. 1 or FIG. 2.

The electronic device is initially on (452), and the user actuates the user-actuable switch 102 to turn the electronic device off (454). The actuation of the user-actuable switch 102 is detected (456). In the case where the switch 102 is a momentarily on switch, actuation of the user-actuable switch 102 causes the indicating element 308 to turn on and emit light (458), and the light from the indicating element 308 is detected by the detecting element 310 (460). In the case where the switch 102 is an on-or-off switch, actuation of the user-actuable switch 102 causes the indicating element 308 to turn off and cease emission of light (458), and the lack of light from the indicating element 308 is detected by the detecting element 310 (460).

In response to detecting actuation of the user-actuable switch 102, a controlled shutdown routine is first performed (462). In the case where the switch 102 is an on-or-off switch, a controlled shutdown routine can be performed even though the user has already turned off the switch 102, because the electronically controllable switch 104 remains on. The electronically controllable switch 104 is then turned off (464). In the case where the switch 102 is a momentarily on switch, the connection of the power source 302 to the power supply of the electronic device through switch pole 330 is disrupted once the user has released the user-actuable switch 102, but the electronically controllable switch 104 can maintain the connection of the power source 302 to the power supply until turned off by the control logic (464) if the switch has been released before the controlled shutdown routine (462) is complete. In the case where the switch 102 is an on-or-off switch, the connection of the power source 302 to the device's power supply is maintained by the electronically controllable switch 104 during the shutdown routine (462). When the shutdown routine is complete the connection from power source 302 to device power supply is immediately disrupted by turning off the electronically controllable switch 104, since the switch 102 is already off.

Specifically, in response to detecting actuation of the user-actuable switch 102, the second indicating element 322 is turned off and thus ceases to emit light (466). This lack of light from the indicating element 322 is detected by the second detecting element 324 (468). That is, current stops flowing through the detecting element 324 (470), which turns off the electronically controllable switch (472).

Representative Electronic Device and Conclusion

Figure 5:
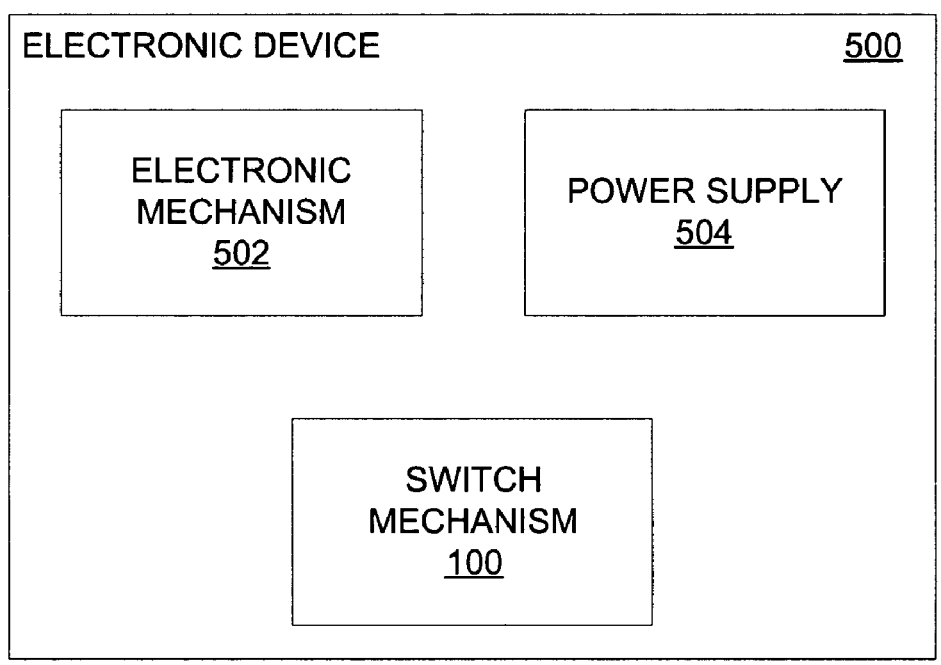
FIG. 5 is a block diagram of a representative electronic device that includes a switch mechanism to completely disconnect the device from a power source, according to an embodiment of the invention.

FIG. 5 is a block diagram of a representative electronic device 500, according to an embodiment of the invention. As can be appreciated by those of ordinary skill within the art, the electronic device 500 can include components in addition to and/or in lieu of those depicted in FIG. 5, and only those components needed to implement an embodiment of the invention are specifically depicted in FIG. 5. The electronic device 500 may be an image-formation device, such as a laser-printing or an inkjet-printing device, another type of computer peripheral device, or another type of electronic device.

The electronic device 500 includes an electronic mechanism 502, a power supply 504, and the switch mechanism 100 of FIGS. 1, 2, and/or 3. The electronic mechanism 502 is that which performs the intended function of the electronic device 500. For instance, the electronic mechanism 502 may be an image-formation mechanism where the device 500 is an image-formation device, such as an inkjet-printing mechanism where the device 500 is an inkjet-printing device, or a laser-printing mechanism where the device 500 is a laser-print device.

The power supply 504 provides power from a power source to the electronic mechanism 502, and is the power supply pointed to by the arrow 110 in FIGS. 1, 2, and 3. For example, the power supply 504 may convert alternating current (AC) to direct current (DC), where the former type of power may be referred to as primary power, and the latter type of power may be referred to as secondary power. The switch mechanism 100 is turned on and off, as has been described, so that the power source is connected to and disconnected from the power supply 504, such that the electronic device 500 is turned on and off. The switch mechanism 100 includes the capability of maintaining connection to the power source until a controlled shutdown sequence has been performed when transitioning from the on to off state. When the device 500 is turned off, the switch mechanism 100 completely disconnects the power supply 504, and hence the device 500, from the power source, such that the power supply 504, and hence the device 500, does not consume any power.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of embodiments of the present invention. Therefore, it is manifestly intended that embodiments of this invention be limited only by the claims and equivalents thereof.

We claim:

1. A mechanism to disconnect an electronic device from a power source comprising:
    a user-actuable switch;
    an electronically controllable switch to couple the power source to the electronic device, and connected in parallel with the user-actuable switch between the power source and a power supply of the electronic device; and,
    a feedback mechanism to turn on and off the electronically controllable switch in response to actuation of the user-actuable switch,
    wherein the user-actuable switch is a momentarily on switch, such that the user-actuable switch upon actuation to turn on the electronic device momentarily couples the power source to the electronic device until the electronically controllable switch is turned on and couples the power source to the electronic device, and
    wherein where the user-actuable switch, after actuation, is released prior to the electronically controllable switch being turned on, the power source becomes decoupled from the electronic device and the electronically controllable switch does not turn on.

2. The mechanism of claim 1, wherein the user-actuable switch is also to couple the power source to the electronic device.

3. The mechanism of claim 1, wherein the electronically controllable switch is a triac.

4. The mechanism of claim 1, wherein the feedback mechanism is to turn off the electronically controllable switch in response to actuation of the user-actuable switch after a controlled shutdown routine for the electronic device has been performed.

5. The mechanism of claim 1, wherein the feedback mechanism comprises:
    a detecting circuit coupled to the user-actuable switch to detect actuation of the user actuable switch; and,
    a control circuit coupled to the electronically controllable switch to turn on and off the electronically controllable switch in response to the detecting circuit detecting the actuation of the user-actuable switch.

6. The mechanism of claim 5, wherein the detecting circuit and the control circuit each comprise an isolating detecting circuit that isolates the power source from the electronic device.

7. The mechanism of claim 6, wherein the isolating detecting circuit of at least one of the detecting circuit and the control circuit is an opto-isolative circuit.

8. The mechanism of claim 1, wherein the user-actuable switch has sufficient insulation to electrically isolate the power source from the feedback mechanism.

9. A mechanism to completely disconnect an electronic device from a power source comprising:
    a user-actuable switch;
    an electronically controllable switch to couple the power source to the electronic device, and connected in parallel with the user-actuable switch between the power source and a power supply of the electronic device; and,
    means for turning on and off the electronically controllable switch in response to actuation of the user-actuable switch after a controlled shutdown routine for the electronic device has been performed,
    wherein the user-actuable switch is a momentarily on switch, such that the user-actuable switch upon actuation to turn on the electronic device momentarily couples the power source to the electronic device until the electronically controllable switch is turned on and couples the power source to the electronic device, and
    wherein where the user-actuable switch, after actuation, is released prior to the electronically controllable switch being turned on, the power source becomes decoupled from the electronic device and the electronically controllable switch does not turn on.

* * * * *